US010321325B2

(12) United States Patent
Gu et al.

(10) Patent No.: US 10,321,325 B2
(45) Date of Patent: Jun. 11, 2019

(54) INTER-NETWORK SHARED FREQUENCY SPECTRUM OPTIMIZATION SYSTEM AND METHOD

(71) Applicant: SHANGHAI RESEARCH CENTER FOR WIRELESS COMMUNICATIONS, Shanghai (CN)

(72) Inventors: Xubo Gu, Shanghai (CN); Jiang Wang, Shanghai (CN); Jing Xu, Shanghai (CN); Yong Teng, Beijing (CN); Kari Horneman, Oulu (FI)

(73) Assignee: SHANGHAI RESEARCH CENTER FOR WIRELESS COMMUNICATIONS, Shanghai (CN)

( * ) Notice: Subject to any disclaimer, the term of this patent is extended or adjusted under 35 U.S.C. 154(b) by 4 days.

(21) Appl. No.: 15/329,802

(22) PCT Filed: Dec. 28, 2015

(86) PCT No.: PCT/CN2015/099266
§ 371 (c)(1),
(2) Date: Jan. 27, 2017

(87) PCT Pub. No.: WO2016/197583
PCT Pub. Date: Dec. 15, 2016

(65) Prior Publication Data
US 2017/0272956 A1    Sep. 21, 2017

(30) Foreign Application Priority Data
Jun. 12, 2015    (CN) .......................... 201510323045.7

(51) Int. Cl.
*H04W 16/14*    (2009.01)
*H04W 16/10*    (2009.01)
(Continued)

(52) U.S. Cl.
CPC ............. *H04W 16/14* (2013.01); *H04L 41/12* (2013.01); *H04W 16/10* (2013.01); *H04W 16/16* (2013.01);
(Continued)

(58) Field of Classification Search
CPC . H04W 84/045; H04W 16/14; H04W 72/082; H04W 72/1215; H04W 24/02;
(Continued)

(56) References Cited

U.S. PATENT DOCUMENTS

| 8,948,768 B2 | 2/2015 | Bienas et al. |
| 2009/0190541 A1 | 7/2009 | Abedi |

(Continued)

FOREIGN PATENT DOCUMENTS

| CN | 102017753 | 4/2011 |
| CN | 103763708 | 4/2014 |

(Continued)

OTHER PUBLICATIONS

Anchora et al. (Capacity Gains due to Orthogonal Spectrum Sharing in Multi-Operator LTE Cellular Networks, symposium, Aug. 28-31, 2012, p. 286-290, IEEE, New York, USA).*
(Continued)

*Primary Examiner* — George Eng
*Assistant Examiner* — Jing Gao
(74) *Attorney, Agent, or Firm* — WPAT, PC

(57) ABSTRACT

Disclosed are an inter-network shared frequency spectrum optimization system and method. In the optimization method, a frequency spectrum resource allocated to a first network in a shared frequency spectrum pool comprises a frequency spectrum resource occupied by an OPEN mode base station in a first cell cluster, and a frequency spectrum resource allocated to a second network in the shared frequency spectrum pool comprises a frequency spectrum
(Continued)

resource occupied by an OPEN mode base station in a second cell cluster, wherein the frequency spectrum resource occupied by each OPEN mode base station in the first cell cluster and the frequency spectrum resource occupied by each OPEN mode base station in the second cell cluster have the same size. The present invention improves the frequency spectrum efficiency and the base station service quality are improved.

12 Claims, 5 Drawing Sheets

(51) Int. Cl.
| | | |
|---|---|---|
| *H04L 12/24* | (2006.01) | |
| *H04W 24/02* | (2009.01) | |
| *H04W 72/04* | (2009.01) | |
| *H04W 16/16* | (2009.01) | |
| *H04W 88/08* | (2009.01) | |
| *H04W 84/04* | (2009.01) | |

(52) U.S. Cl.
CPC ....... *H04W 24/02* (2013.01); *H04W 72/0486* (2013.01); *H04W 84/045* (2013.01); *H04W 88/08* (2013.01)

(58) Field of Classification Search
CPC ........... H04W 52/244; H04W 74/0808; H04W 36/0083; H04W 88/10; H04W 24/10; H04W 52/243; H04W 72/04; H04W 88/08; H04W 92/20; H04W 52/245; H04W 72/0453; H04W 72/085; H04W 74/0816; H04W 52/24; H04W 52/281; H04W 52/50; H04W 84/12; H04W 88/12; H04W 16/10; H04W 16/16; H04L 41/12
See application file for complete search history.

(56) References Cited

U.S. PATENT DOCUMENTS

| | | | |
|---|---|---|---|
| 2009/0325634 A1* | 12/2009 | Bienas | H04W 72/0426 455/552.1 |
| 2012/0289274 A1 | 11/2012 | Matsuo | |
| 2014/0357285 A1 | 12/2014 | Smith et al. | |
| 2017/0013468 A1 | 1/2017 | Zhu et al. | |

FOREIGN PATENT DOCUMENTS

| | | | | |
|---|---|---|---|---|
| CN | 103763708 A | * | 4/2014 | ............ H04L 41/12 |
| JP | 2012080347 | | 4/2012 | |

OTHER PUBLICATIONS

Hany Kamal, Marceau Coupechoux, Philippe Godlewski, Inter-operator spectrum sharing for cellular networks using game theory, symposium, Sep. 13-16, 2009, p. 425-429, IEEE, New York U.S.A.
Luca Anchora, Leonardo Badia, Eleftherios Karipidis, Michele Zorzi, Capacity gains due to orthogonal spectrum sharing in multi-operator LTE cellular networks, symposium, Aug. 28-31, 2012, p. 286-290, IEEE, New York U.S.A.
Sofonias Hailu, Alexis A. Dowhuszko, Olav Tirkkonen, Adaptive co-primary shared access between co-located radio access networks, International Conference, Jun. 2-4, 2014, p. 131-135, IEEE, New York U.S.A.

* cited by examiner

INTER-NETWORK SHARED FREQUENCY SPECTRUM OPTIMIZATION SYSTEM AND METHOD

BACKGROUND

Technical Field

The present invention relates to a system for optimizing an inter-network shared spectrum, which is configured to dynamically allocate a shared spectrum based on a Closed Subscriber Group (CSG) base station proportion, also relates to a corresponding method for optimizing an inter-network shared spectrum, and falls within the technical field of wireless communication.

Related Art

Recently, with the continuous development of a wireless communication system and the great popularization of an intelligent terminal, requirements of subscribers for data communication services are increasingly high, and corresponding transmission spectrum demands are increasingly high as well. However, spectrum resources suitable for wireless transmission are limited. In order to avoid mutual interference, various countries in the world adopt static spectrum allocation policies at present, some licensed bands are allocated to a certain fixed wireless service for use, and due to the fact that data transmission is carried out on remaining unlicensed bands by virtue of many wireless communication technologies, spectrum resources at this band are quite crowded. On the other hand, monitoring data of a Federal Communications Commission (FCC) shows that the utilization rate of spectra at most of current licensed bands is as low as 15-85%. Particularly, some spectra are not occupied within most of the time, which may cause serious waste of spectrum resources.

In order to improve the utilization efficiency of spectra, people pay more and more attention to research on a dynamic spectrum resource sharing technology, and research on an inter-operator (cross-network) dynamic spectrum resource sharing technology is one of the hot topics.

At present, inter-operator dynamic spectrum resource sharing is mainly implemented by a shared spectrum pooling technology, different operators combine some or all of their owned spectrum resources to constitute a shared spectrum pool, and shared spectrum pool resources are dynamically and reasonably allocated by virtue of a relevant optimization mechanism. Compared with intra-operator dynamic spectrum resource sharing, the inter-operator dynamic spectrum resource sharing technology can effectively relieve imbalance between services of different operators in a specific area, can improve the flexibility and fairness in spectrum resource sharing, can further improve the utilization rate of spectrum resources, and can relieve the problem of shortage of the spectrum resources.

In the prior art, R. H. Kamal, et al., proposed a centralized dynamic inter-operator spectrum sharing solution based on a game algorithm (with reference to PIMRC"09,pp. 425-429). It analyzes a process of competition between different operators by establishing a non-zero sum game algorithm model. A spectrum management entity is shared for centralized management on cell base stations of different operators, and the entity carries out global optimal spectrum resource allocation by analyzing relevant information reported by each cell base station. However, how to ensure the fairness in spectrum allocation and the privacy of interaction information is vital. In view of the sensitivity of interaction information between different operators, it is still hard to share the same spectrum management entity between different operators. V. L. Anchora, et al., proposed an optimized shared spectrum allocation method according to downlink channel selection (with reference to Proc. IEEE ISWCS, pp. 286-290, August 2012). By virtue of results of measuring different channels by different base station terminal subscribers, each base station selects optimal channel resources, in a shared spectrum pool, to be transmitted, thereby improving the efficiency of spectrum resources. However, since optimal channels selected in the shared spectrum pool by each base station are probably overlapped, a great number of signaling overheads will be brought during negotiation for conceding, and the Quality of Service (QoS) of a wireless transmission system is affected. S. Hailu, et al., proposed an adaptive spectrum sharing algorithm between different operators (with reference to Proc. Int. Conf. Cognitive Radio Oriented Wireless Netw., June 2014, pp. 131-135), bandwidths are divided into exclusive bandwidths and shared bandwidths for use, and when having access to a channel, a subscriber preferentially selects an exclusive channel or a shared channel in consideration of inter-network interference intensity.

However, these methods only consider an inter-operator spectrum sharing situation of a base station in a single working mode within the same area. In an actual deployment scenario, base stations in different working modes are usually deployed within an area in a mixed manner according to actual demands. Thus, among base stations probably distributed in different cell clusters within an area, the quantity of CSG-mode base stations and the quantity of OPEN-mode base stations are different. If the same shared spectrum size is set for each cell cluster, average bandwidths of subscribers will be affected, thereby affecting the QoS. On the other hand, a base station can adjust a working mode as needed. For instance, a CSG mode is adjusted to an OPEN mode or the CSG mode is adjusted as the OPEN mode. But if the working mode of the base station is changed, the average bandwidths of the subscribers will be affected, thereby affecting the QoS.

SUMMARY

The technical problem to be solved by the present invention lies in provision of a system and method for optimizing an inter-network shared spectrum, which can dynamically allocate a shared spectrum by virtue of auxiliary judgment based on a CSG-mode base station proportion.

To this end, the present invention adopts the technical solutions as follows.

A system for optimizing an inter-network shared spectrum comprises, at least, a first network and a second network, the first network comprising a first cell cluster, the second network comprising a second cell cluster, the two cell clusters sharing a spectrum pool, and each cell cluster having a plurality of base stations working in a CSG mode or an OPEN mode, wherein spectrum resources, allocated to the first network, in the shared spectrum pool comprise spectrum resources occupied by the OPEN-mode base stations of the first cell cluster, and spectrum resources, allocated to the second network, in the shared spectrum pool comprise spectrum resources occupied by the OPEN-mode base stations of the second cell cluster. The size of the spectrum resource occupied by each OPEN-mode base station in the first cell cluster is the same as that of the spectrum resource occupied by each OPEN-mode base station in the second cell cluster. Or, the size of a spectrum resource occupied by a terminal served by each OPEN-mode base station in the first cell cluster is the same as that of a spectrum resource occupied by a terminal served by each OPEN-mode base station in the second cell cluster.

A method for optimizing an inter-network shared spectrum comprises, at least, a first network and a second network, the first network comprising a first cell cluster, the second network comprising a second cell cluster, the cell clusters sharing a spectrum pool, and each cell cluster having a plurality of base stations working in a CSG mode or an OPEN mode, wherein the shared spectrum pool is established between the first network and the second network, the first network triggers initialization of the shared spectrum pool according to an own spectrum demand, and then the first network and the second network initialize the shared spectrum pool;

after the initialization of the shared spectrum pool is completed, the size of a spectrum resource occupied by each OPEN-mode base station in the first cell cluster is the same as that of a spectrum resource occupied by each OPEN-mode base station in the second cell cluster; or, the size of a spectrum resource occupied by a terminal served by each OPEN-mode base station in the first cell cluster is the same as that of a spectrum resource occupied by a terminal served by each OPEN-mode base station in the second cell cluster.

The present invention, by providing an inter-operator dynamic spectrum sharing mechanism based on a CSG-mode base station proportion, optimizes a shared spectrum pool allocation policy, and aids in improving the average QoS of each operator base station in cell clusters. Compared with the prior art, the method proposed by the present invention comprehensively considers a differentiated demand for a spectrum caused by factors such as a working mode of a base station, a service load variation and a topological structure variation, and can more reasonably carry out initialized allocation and re-allocation on a shared spectrum pool together with a dynamic variation of the working mode of the base station, thereby improving the efficiency of the spectrum and the QoS of the base station.

DETAILED DESCRIPTION

The technical solution of the present invention will be further illustrated below with reference to drawings and specific embodiments in detail.

In one embodiment of the present invention, the problem about inter-operator spectrum sharing in an LTE (including, but not limited to, TD-LTE and FDD-LTE) heterogeneous network is mainly considered. But it stands to reason that the technical idea provided by the present invention can also be applied to other hybrid networking wireless communication systems such as a TD-SCDMA, CDMA2000 and WCDMA hybrid networking wireless communication system, or even used in a 4G/5G network.

In the LTE heterogeneous network, some home base stations are deployed in an overlapped manner within a coverage range of a macro base station, working modes of these home base stations comprising a CSG (Closed User Group) mode and an OPEN mode. The home base stations working in the CSG mode only serve registered subscribers of an operator, and the home base stations working in the OPEN mode can serve all subscribers under the operator. Usually, the quantity of subscribers who can be served by CSG-mode base stations is relatively small, and the quantity of subscribers who can be served by OPEN-mode base stations is relatively large. When cell clusters constituted by home base stations belonging to different operators carry out spectrum sharing, how to reasonably allocate resources of a shared spectrum pool will be directly related to the utilization efficiency of spectrum resources. Since the quantity of CSG base stations and OPEN base stations deployed in cell clusters of different operators is probably different, a CSG-mode base station proportion of each cell cluster will be probably different. In order to more reasonably and fairly allocate the resources of the shared spectrum pool, the CSG-mode base station proportion of each cell cluster can be considered as a key parameter of resource allocation. The CSG-mode base station proportion is defined by a quantity of the CSG base stations divided by a sum of the CSG and OPEN base stations in a cell cluster.

Although the present invention is illustrated with cell clusters of two or more different operator operating networks (operator operating networks being hereinafter referred to as operators), the present invention is not limited to networks of different operators, and can be applied to a network of the same operator. Moreover, although the present invention is illustrated with two networks, the present invention is not limited to the two networks, and can be applied to a plurality of networks.

Figure 1:
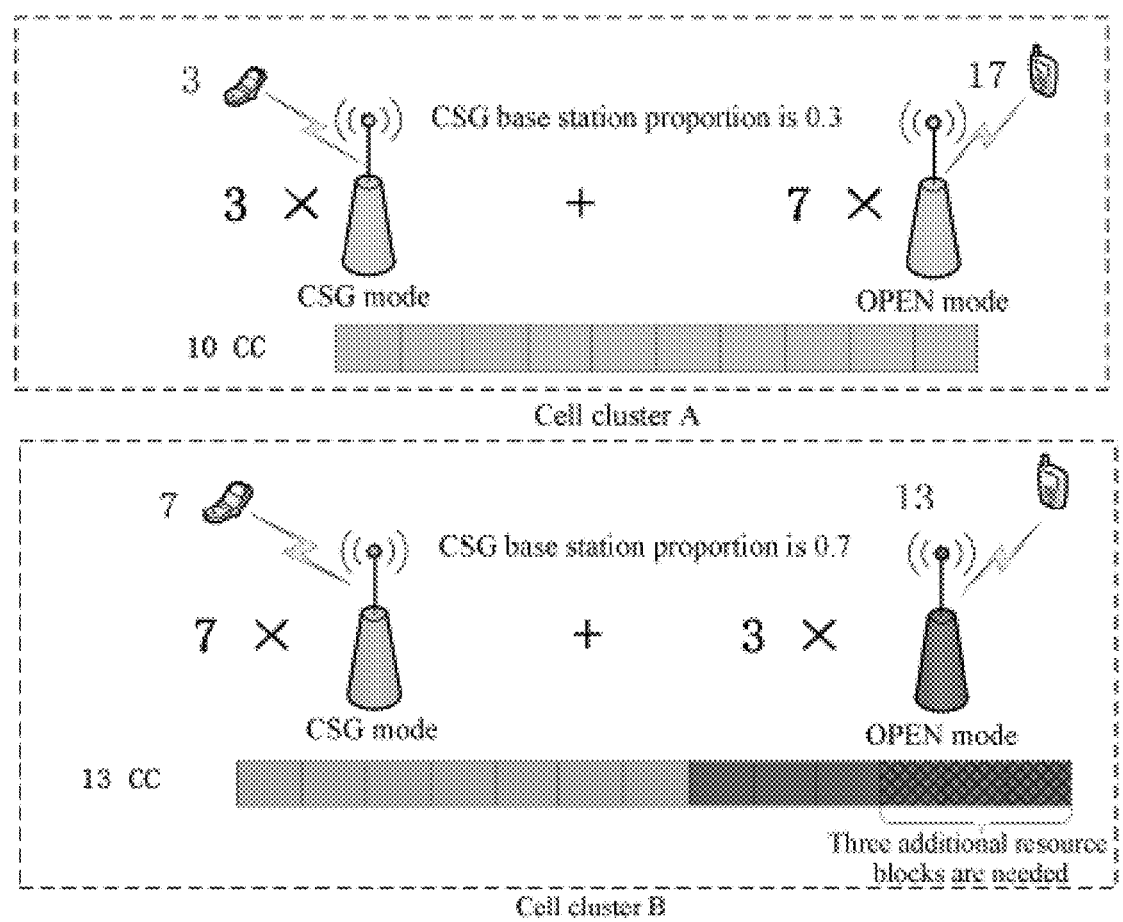
FIG. 1 is a diagram illustrating a spectrum resources allocation difference between cell clusters having different CSG-mode base station proportions.

Detailed discussion and analysis will be carried out below in a supposed specific scenario. As shown in FIG. 1, a cell cluster A and a cell cluster B respectively belongs to a first network and a second network. The cell cluster A and the cell cluster B individually have ten home base stations, each base station being allocated with at least one Component Carrier (CC), and each CC serving a plurality of subscribers. The cell cluster A has three CSG-mode base stations, seven OPEN-mode base stations, twenty subscribers (including three CSG registered subscribers and seventeen non-CSG registered subscribers) and ten CCs. If each CSG-mode base station only serves a registered subscriber using the owned CC in order to meet a QoS requirement of the registered subscriber, so the three CSG-mode base stations at least need three CCs. The remaining seven OPEN-mode base stations need to serve seventeen subscribers using the remaining seven CCs, an average bandwidth of each subscriber being 7/17. Based on the similar analysis, the cell cluster B has seven CSG-mode base stations, three OPEN-mode base stations, twenty subscribers (including seven CSG registered subscribers and thirteen non-CSG registered subscribers) and ten CCs. The seven CSG-mode base stations at least need seven sub-carriers to serve the seven registered subscribers. So, the remaining three OPEN-mode base stations need to serve the thirteen subscribers using the remaining three sub-carriers, an average bandwidth of each subscriber being 3/13. According to the above analysis, it can be found that the OPEN-mode base stations in the cell cluster B need more CCs to be capable of achieving the same QoS as that of the OPEN-mode base stations in the cell cluster A. The key of the problem lies in the quantity and proportion of CSG base stations in cell clusters. Compared with an OPEN-mode base station in a cell cluster (the cell cluster A, for instance) having a low CSG-mode base station proportion, a cell cluster (the cell cluster B, for instance) having a high CSG-mode base station proportion needs more spectrum resources so as to achieve that the OPEN-mode base stations in both cell clusters achieve similar QoS.

On the basis of the above analysis, the present invention proposes an inter-operator spectrum sharing mechanism based on a CSG-mode base station proportion of a cell cluster, which allocates/re-allocates spectrum resources of a shared spectrum pool between different operators based on the CSG-mode base station proportion and dynamic variation of each cell cluster. The mechanism can be implemented in two stages: a shared spectrum pool initialized allocation stage and a shared spectrum pool re-allocation stage. In the initialized allocation stage, cell clusters belonging to different operators allocate spectrum resources in the shared spectrum pool according to respective CSG-mode base station proportions. Since CSG base stations only serve registered subscribers thereof, a cell cluster having a high CSG-mode base station proportion occupies more spectrum resources in the shared spectrum pool while a cell cluster having a low CSG-mode base station proportion occupies fewer spectrum resources in the shared spectrum pool, thereby guaranteeing the QoS of OPEN-mode base stations in the cell cluster having the high CSG-mode base station proportion.

The present invention guarantees that OPEN-mode base stations in two spectrum sharing cell clusters in different networks have the same service bandwidth (when the OPEN-mode base stations serve an equal number of terminals), so as to ensure the relative fairness of the QoS.

In one embodiment of the present invention, dynamic optimal allocation of a shared spectrum pool between different operators based on a CSG-mode base station proportion of a cell cluster of each operator is illustrated with a first operator (a first network operated by the first operator) and a second operator (a second network operated by the second operator). It should be noted that the present invention can also be applied to a situation that CSG-mode base station proportions of different cell clusters of the same operator are different.

Specifically speaking, during inter-operator (cross-network) spectrum sharing, cell clusters of different operators need to allocate the shared spectrum pool according to respective CSG-mode base station proportions, such that a cell cluster having a high CSG-mode base station proportion occupies more spectrum resources in the shared spectrum pool, thereby guaranteeing that the relative fairness of the QoS of a plurality of OPEN-mode base stations of a plurality of cell clusters having different CSG-mode base station proportions can be achieved. The relative fairness refers to that if OPEN-mode base stations in the same cell cluster occupy the same spectrum resources or terminals served by the OPEN-mode base stations occupy the same spectrum resources, OPEN-mode base stations in different cell clusters have the similar QoS.

In principle, spectrum resources $Band_A$, allocated to a first network in a shared spectrum pool, are equal to the sum of spectrum resources occupied by CSG-mode base stations in a cell cluster A (a first cell cluster) of the first network and spectrum resources occupied by OPEN-mode base stations in the cell cluster A. The spectrum resources occupied by the OPEN-mode base stations in the cell cluster A are calculated by means of the following method: multiply the quantity of the OPEN-mode base stations in the cell cluster A of the first network by spectrum resources for all OPEN-mode base stations of the cell cluster A and the cell cluster B in the shared spectrum pool, and then divide by the total quantity of the OPEN-mode base stations of the cell cluster A and the cell cluster B.

Similarly, spectrum resources $Band_B$, allocated to a second network, in the shared spectrum pool, are equal to the sum of spectrum resources occupied by CSG-mode base stations in the cell cluster B (a second cell cluster) of the second network and spectrum resources occupied by the OPEN-mode base stations in the cell cluster B. The spectrum resources occupied by the OPEN-mode base stations in the cell cluster B are calculated by means of the following method: multiply the quantity of the OPEN-mode base stations in the cell cluster B of the second network by the spectrum resources, for all OPEN-mode base stations of the cell cluster A and the cell cluster B in the shared spectrum pool, and divide by the total quantity of the OPEN-mode base stations of the cell cluster A and the cell cluster B.

Figure 2:
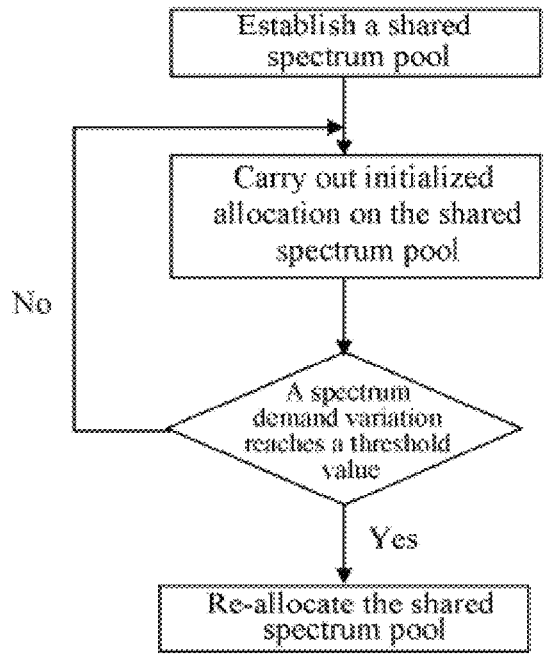
FIG. 2 is a diagram illustrating an allocation process of an inter-operator shared spectrum pool.

As shown in FIG. 2, an implementation process of an inter-operator shared spectrum pool initialized allocation and re-allocation mechanism involved in the present invention can be divided into two stages, namely a shared spectrum pool initialization stage and a shared spectrum pool re-allocation stage. Firstly, a shared spectrum pool is established between networks operated by different operators, a first network triggers initialization of the shared spectrum pool according to an own spectrum demand, and then the first network and a second network initialize the shared spectrum pool. After the initialization of the shared spectrum pool is completed, the first network or the second network judges whether the own spectrum demand varies, and if the variation reaches a preset threshold value, re-allocation of the shared spectrum pool is triggered. It should be noted that according to actual situations, the shared spectrum pool can be established between the networks operated by different operators and then the shared spectrum pool is directly initialized.

The shared spectrum pool initialization stage specifically comprises the following steps: the first network (for instance, a network where a cell cluster A is located) triggers initialization of the shared spectrum pool according to a resource demand, and sends a shared spectrum pool initialization indication signaling to the second network (for instance, a network where a cell cluster B is located). After receiving the signaling, the second network calculates a shared spectrum pool initialized allocation proportion according to a signaling parameter, and then sends a shared spectrum pool initialized allocation proportion indication signaling to the first network. After receiving the shared spectrum pool initialized allocation proportion indication signaling, the first network compares the shared spectrum pool initialized allocation proportion indication signaling with a shared spectrum pool initialized allocation proportion self-calculated by the first network. If the comparison result shows consistency, the first network sends an indication of consistent judgment to the second network (or sends an indication of allocating spectrum resources to the second network); if the comparison result shows inconsistency, the first network sends an indication of inconsistency to the second network (or sends an indication of re-calculation to the second network), and the step that the second network calculates the shared spectrum pool initialized allocation proportion is re-executed.

<First Embodiment>

First Stage: Shared Spectrum Pool Initialization Stage

A method for establishing a shared spectrum pool mentioned in the present invention can adopt various manners, and can be communication negotiation between spectrum controllers specially responsible for allocating spectrum resources for different operator networks, thereby establishing a shared spectrum pool. A shared spectrum pool can be established by means of a communication negotiation mechanism between all cluster headers after a cluster header of each cell cluster collects relevant spectrum resource information about member base stations of the present cell cluster. A shared spectrum pool establishment method (patent application number: 201410032758.3) disclosed in a network spectrum sharing method applied by this applicant on Jan. 23, 2014 can be used as a reference, which will not be elaborated herein.

In one embodiment of the present invention, a CSG-mode base station proportion of a cell cluster serves as a key factor of allocation of the shared spectrum pool, and meanwhile, some other relevant parameters (such as a service load, a topological structure and the quantity of terminal subscribers) can also be taken into consideration. For instance, in consideration of differences (such as an actual service load situation of each cell cluster and the quantity of service subscribers) which may actually exist in different cell clusters, in the present invention, if they are treated with no differences, it will not aid in improving the utilization rate of spectrum resources to the greatest extent. Thus, it can be considered that a CSG-mode base station proportion of each cell cluster serves as an absolute influence factor of allocation of spectrum resources in the shared spectrum pool, a larger weight value is set (for instance, $\alpha=0.9$), and smaller weight values (for instance, $\beta=0.1$) are set for other influence factors, such that certain differences, existing in the spectrum allocation of the shared spectrum pool, of different cell clusters are considered, generality is also considered, and the CSG-mode base station proportion of each cell cluster serves as a main determining factor of spectrum allocation.

In order to guarantee basic communication QoS, a cell cluster having a high CSG-mode base station proportion shall occupy more spectrum resources in the shared spectrum pool. A first network and a second network guarantee the implementation of an initialization process by means of the following new interactive signaling.

1. Shared Spectrum Pool Initialized Allocation Indication Signaling

After the shared spectrum pool is established, it is necessary to carry out initialized allocation on shared spectrum resources, except spectrum resources exclusively occupied by each operator, in the spectrum pool. Demands of member base stations in each cell cluster for spectrum resources trigger spectrum controllers of different networks to initialize the spectrum resources in the shared spectrum pool.

After the shared spectrum pool is established, the spectrum controllers of different networks will send a shared spectrum pool initialized allocation indication signaling to each other, and trigger a shared spectrum pool initialized allocation process. The shared spectrum pool initialized allocation indication signaling comprises the following parameters:

an initialization flag bit;
a CSG-mode base station proportion of a cell cluster of a network to which a spectrum controller is attached; and
position information about a spectrum controller of a cell cluster of an operator.

The shared spectrum pool initialized allocation indication signaling can also comprise other relevant parameters such as a service load, a topological structure and the quantity of terminal subscribers.

Figure 3:
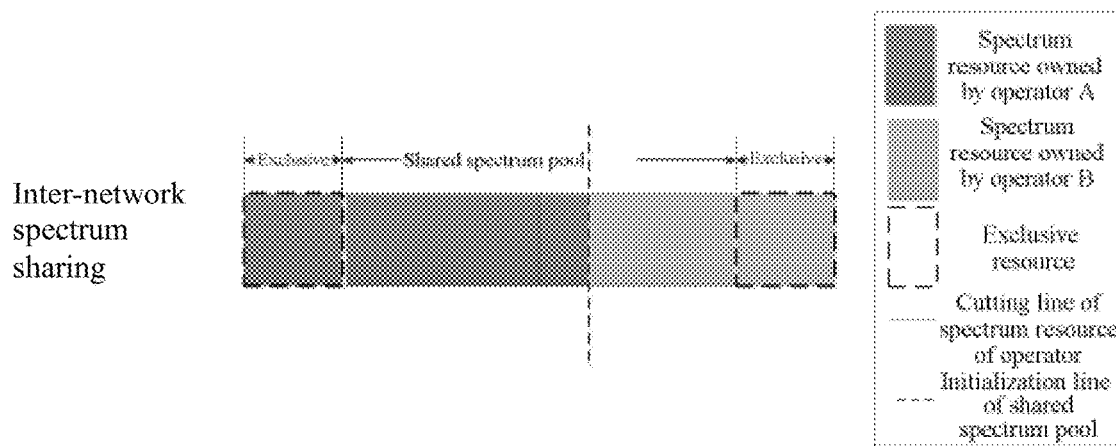
FIG. 3 is a diagram illustrating an initialization process of a shared spectrum pool.
Figure 4:
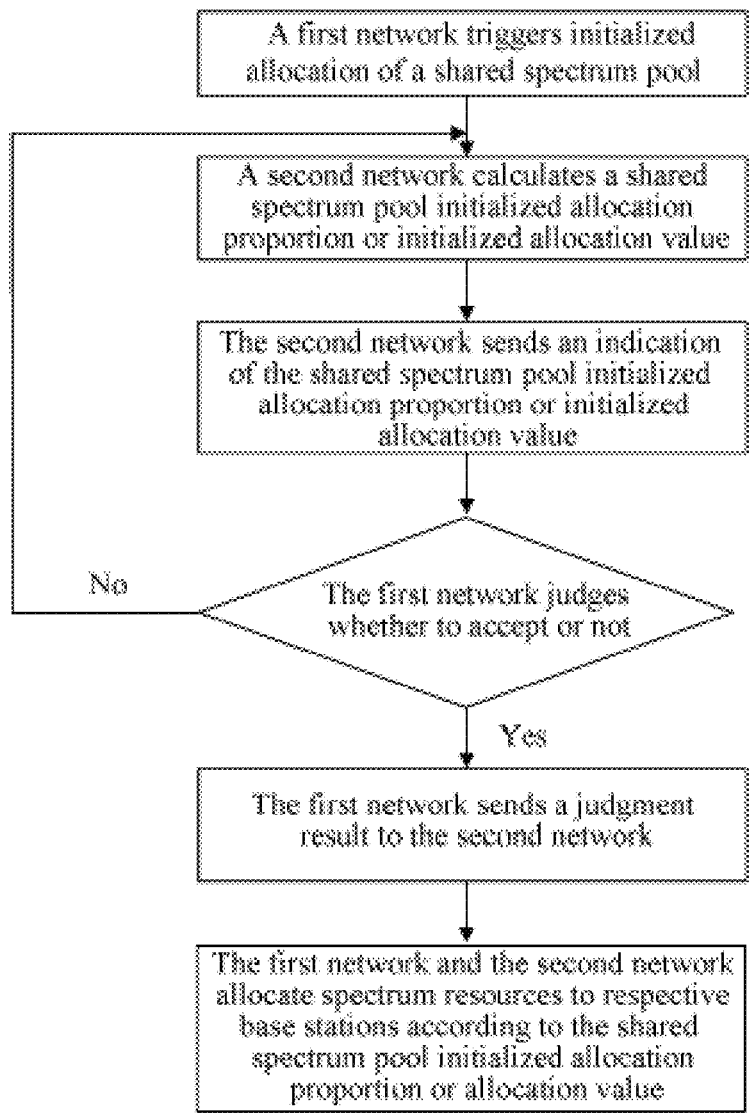
FIG. 4 is a flowchart showing an initialization process of a shared spectrum pool.

FIG. 3 and FIG. 4 show initialized allocation methods for a shared spectrum pool under different operator network conditions. In FIG. 3, a solid line in the shared spectrum pool represents a spectrum resource allocation state when the shared spectrum pool is uninitialized, and the spectrum resources at both sides of the solid line belong to different operator's cell clusters.

In order to facilitate understanding, in this scenario, suppose a cell cluster A and a cell cluster B have an equal number of base stations. Thus, before the shared spectrum pool is initialized, the cell cluster A and the cell cluster B occupy the same spectrum resources. In other words, the solid line in the shared spectrum pool in FIG. 3 is located in the middle of the whole spectrum resource shown in FIG. 3. Actually, the cell cluster A and the cell cluster B can have different numbers of base stations.

The cell cluster A and the cell cluster B can be in such a situation that: the cell cluster A and the cell cluster B have an equal number of base stations, but during initialization, the quantity of base stations in a CSG mode in the cell cluster A is greater than that of base stations in a CSG mode in the cell cluster B.

Thus, there are different numbers of base stations in the CSG mode among member base stations of the cell cluster A and the cell cluster B, and the spectrum resources in the shared spectrum pool can be divided according to a CSG-mode base station proportion of each cell cluster and the quantity of the member base stations.

For instance, the quantity of the member base stations of the cell cluster A is TA, and the CSG-mode base station proportion is $A_{CSG}$. The quantity of the member base stations of the cell cluster B is TB, and the CSG-mode base station proportion is $B_{CSG}$. And the size of the shared spectrum pool is Band (MHz). Here, it is necessary to set a working bandwidth $Band_{CSG}$ (MHz) for a CSG base station. In consideration of a relatively small number of service terminals of the CSG base station, the $Band_{CSG}$ shall be set as a certain value smaller than Band/(TA+TB), namely $Band_{CSG}$<Band/(TA+TB). According to the above relevant parameters, spectrum resources $Band_A$ occupied by the cell cluster A in the shared spectrum pool shall be represented as:

$$Band_A = TA \times A_{CSG} \times Band_{CSG} + \qquad (1)$$
$$TA \times (1 - A_{CSG}) \times \frac{Band - Band_{CSG} \times (TA \times A_{CSG} + TB \times B_{CSG})}{TA \times (1 - A_{CSG}) + TB \times (1 - B_{CSG})}$$

Spectrum resources $Band_B$ occupied by the cell cluster B shall be represented as:

$$Band_B = TB \times B_{CSG} \times Band_{CSG} + \qquad (2)$$
$$TB \times (1 - B_{CSG}) \times \frac{Band - Band_{CSG} \times (TA \times A_{CSG} + TB \times B_{CSG})}{TA \times (1 - A_{CSG}) + TB \times (1 - B_{CSG})}.$$

According to formulas (1) and (2), it can be known that the spectrum resources $Band_A$ occupied by the cell cluster A in the shared spectrum pool are the sum of spectrum resources occupied by CSG-mode base stations in the cell cluster A and spectrum resources occupied by OPEN-mode base stations in the cell cluster A, wherein the spectrum resources occupied by the OPEN-mode base stations are obtained by averagely allocating spectrum resources in the shared spectrum pool, except for the spectrum resources occupied by the CSG-mode base stations in each network, to the OPEN-mode base stations in each network.

According to the formula (2), it can be known that the spectrum resources $Band_B$ occupied by the cell cluster B are the sum of spectrum resources occupied by CSG-mode base stations in the cell cluster B and spectrum resources occupied by OPEN-mode base stations in the cell cluster B, wherein the spectrum resources occupied by the OPEN-mode base stations are obtained by averagely allocating spectrum resources in the shared spectrum pool, except for the spectrum resources occupied by the CSG-mode base stations in each network, to the OPEN-mode base stations in each network.

Along with increasing of the CSG-mode base station proportion of a certain cell cluster, the spectrum resources correspondingly occupied by the cell cluster in the shared spectrum pool is continuously increased, such that the fairness of spectrum resources owned by each base station in the case that cell clusters have different numbers of member base stations is guaranteed. Certainly, the above formulas have generality, and are applicable to a situation that the cell cluster A and the cell cluster B have an equal number of member base stations. In this case, in the formulas, A=B.

The formulas (1) and (2) represent that a spectrum bandwidth of a shared spectrum pool is equal to the sum of spectrum resources used by CSG base stations and spectrum resources used by OPEN base stations in two cell clusters (A and B) which share the shared spectrum pool. The spectrum resources used by the CSG base stations in the two cell clusters (A and B) are $TA*A_{CSG}*Band_{CSG}$ and $TB*B_{CSG}*Band_{CSG}$, respectively. The sum of the spectrum resources used by the OPEN base stations in the two cell clusters (A and B) is $$Band-TA*A_{CSG}*Band_{CSG}-TB*B_{CSG}*Band_{CSG}=Band-Band_{CSG}(TA*A_{CSG}+TB*B_{CSG}).$$

The spectrum resource used by each OPEN-mode base station in the two cell clusters (A and B) is an average value obtained by dividing the sum of the spectrum resources used by all OPEN base stations in the two cell clusters (A and B) by the total quantity of OPEN-mode base stations in the two cell clusters (A and B)

2. Shared Spectrum Pool Initialized Spectrum Allocation Proportion Indication Signaling According to a CSG-mode base station proportion and other relevant parameters in the received shared spectrum pool initialized allocation indication signaling, a spectrum controller of each operator calculates the proportion and quantity of spectrum resources individually occupied in the shared spectrum pool. The spectrum controller of the network where the cell cluster A is located figures out that the proportion of spectrum resources occupied by the network in the shared spectrum pool is $Band_A/(Band_A+Band_B)$, and the spectrum controller of the network where the cell cluster B is located figures out that the proportion of spectrum resources occupied by the network in the shared spectrum pool is $Band_B/(Band_A+Band_B)$.

The spectrum controllers of all networks send a shared spectrum pool initialized spectrum allocation proportion indication signaling to each other, so as to indicate the proportion of the spectrum resources occupied by each cell cluster in the shared spectrum pool. By illustrating with two networks, the spectrum controller of the network where the cell cluster A is located only sends the proportion $Band_A/(Band_A+Band_B)$, the spectrum resources occupied by the cell cluster A, and the proportion $Band_B/(Band_A+Band_B)$, the spectrum resources occupied by the cell cluster B. The spectrum controller of the network where the cell cluster B is located only sends the proportion $Band_B/(Band_A+Band_B)$, the spectrum resources occupied by the cell cluster B, and the proportion $Band_A/(Band_A+Band_B)$, the spectrum resources occupied by the cell cluster A.

It should be particularly noted that it is necessary to use the same calculation criterion and standard in calculation, and the corresponding calculation results shall be consistent.

As an optional solution, the shared spectrum pool initialized spectrum allocation proportion indication signaling can be only an allocation value of spectrum resources occupied by the present cell cluster in the shared spectrum pool. That is, the spectrum controller SCA of the network where the cell cluster A is located only sends spectrum resources $Band_A$ occupied by the cell cluster A, and the spectrum controller of the network where the cell cluster B is located only sends an allocation value $Band_B$ of spectrum resources occupied by the cell cluster B.

3. Shared Spectrum Pool Initialized Allocation Answer Signaling

According to the received shared spectrum pool initialized spectrum allocation proportion indication signaling, spectrum controllers of all operators need to negotiate and determine an initialized allocation proportion of the shared spectrum pool, namely an initialization line, and occupy shared spectrum resources in proportion respectively.

The spectrum controllers of all operators (the spectrum controllers of all networks) send a shared spectrum pool initialized allocation answer signaling to each other, so as to indicate whether the spectrum controller of each operator agrees with a division result of a spectrum allocation proportion of the shared spectrum pool in an initialization process. The shared spectrum pool initialized spectrum allocation proportion indication signaling comprises a parameter of a proportion of spectrum resources occupied by each cell cluster in the shared spectrum pool, a corresponding spectrum resource quantity parameter, and the like. Those parameters are calculated by each cell cluster.

Specifically speaking, by illustrating with two networks, the spectrum controller SCB of the network where the cell cluster B is located receives a shared spectrum pool initialized spectrum allocation proportion indication signaling sent by the spectrum controller SCA, and acquires $Band_A/(Band_A+Band_B)$, the proportion of spectrum resources occupied by the cell cluster A in the signaling, and $Band_B/(Band_A+Band_B)$, the proportion of spectrum resources occupied by the cell cluster B. Similarly, the spectrum controller SCA of the network where the cell cluster A is located can acquire, from a shared spectrum pool initialized allocation answer signaling sent by the spectrum controller SCB, $Band_B/(Band_A+Band_B)$, the proportion of spectrum resources occupied by the cell cluster B, and $Band_A/(Band_A+Band_B)$, a proportion of spectrum resources occupied by the cell cluster A.

The spectrum controller of each operator compares the spectrum resource proportion of each cell cluster in the received shared spectrum pool initialized spectrum allocation proportion indication signaling, with the spectrum resource proportion of each cell cluster calculated by the spectrum controller itself. If the comparison presents consistence, the spectrum controllers send the shared spectrum pool initialized allocation answer signaling to each other so as to complete negotiation. Specifically speaking, the spectrum controller SCA of the network where the cell cluster A is located acquires from the received shared spectrum pool initialized allocation answer signaling, $Band_B/(Band_A+Band_B)$, i.e. the proportion of spectrum resources occupied by the cell cluster B, and $Band_A/(Band_A+Band_B)$, i.e. the proportion of spectrum resources occupied by the cell cluster A. If the two proportions are consistent with the proportions, calculated by the spectrum controller SCA, of spectrum resources occupied by the cell cluster A and the cell cluster B respectively, the spectrum controller SCA sends the shared spectrum pool initialized allocation answer signaling, so as to indicate that the SCA agrees with the division result of the spectrum allocation proportion of the shared spectrum pool, the division result showing that: the cell cluster A occupies $Band_A/(Band_A+Band_B)$ spectrum resources and the cell cluster B occupies $and_B/(and_A+Band_B)$ spectrum resources.

The cell cluster A has a higher CSG-mode base station proportion. So, compared with the cell cluster B, the cell cluster A shall occupy more spectrum resources in the shared spectrum pool to guarantee the QoS of OPEN-mode base stations thereof. In FIG. 3, a dotted line located in the shared spectrum pool indicates the quantity of shared pool resources in shared spectra occupied by the cell cluster A and the cell cluster B after the initialization process of the shared spectrum pool. The dotted line in the shared spectrum pool is the initialization line. The initialization line of the shared spectrum pool represents that the cell cluster A and the cell cluster B negotiate to determine respective proportions in the shared spectrum pool, the initialization line divides the shared spectrum pool in accordance with the negotiated proportions, and the two cell clusters occupy and use spectrum resources at two sides of the initialization line respectively.

Accordingly, the spectrum controller SCA of the network where the cell cluster A is located calculates spectrum resources occupied by the cell cluster A in the shared spectrum pool in accordance with the negotiated proportion, and allocates the spectrum resources to each base station of the cell cluster A. The spectrum controller SCB of the network where the cell cluster B is located calculates spectrum resources occupied by the cell cluster B in the shared spectrum pool in accordance with the negotiated proportion, and allocates the spectrum resources to each base station of the cell cluster B.

Second Stage: Shared Spectrum Pool Re-allocation Process

The initialization process mentioned in the first stage guarantees the relative fairness and stability in spectrum allocation of a shared spectrum pool, which may reduce signaling overheads needed by the whole network in an inter-operator spectrum sharing negotiation process. However, when a CSG-mode base station proportion or other relevant parameters (such as increase of a service load and change of a topological structure) of a cell cluster are changed, a spectrum demand corresponding to the cell cluster is increased. When a spectrum demand increment reaches a preset threshold value, a shared spectrum pool re-allocation process will be triggered (in the following description, a cell cluster A (operator A) and a cell cluster B (operator B) are taken as an example, and suppose a CSG-mode base station proportion or other relevant parameters of the cell cluster A are changed).

1. Shared Spectrum Pool Re-allocation Request Indication Signaling

When the CSG-mode base station proportion or other relevant parameters of the cell cluster A are changed, a spectrum controller SCA (first network) will evaluate a current state thereof to decide whether to carry out a shared spectrum pool re-allocation process.

If a current spectrum demand variation of the first network exceeds a preset threshold value, the spectrum controller SCA will send a shared spectrum pool re-allocation request indication signaling to a spectrum controller SCB (second network).

Here, the threshold value can be defined as a corresponding proportion. For instance, the threshold value can be defined as 10%, and when a spectrum demand increment ($\Delta$) of the spectrum controller SCA exceeds ten percent of the quantity of currently owned spectrum resources thereof, a spectrum re-allocation process is triggered.

The shared spectrum pool re-allocation request indication signaling comprises the following three parameters:
  position information about a spectrum controller of a cell cluster of an operator;
  a re-allocation flag bit: indicating a reason for triggering re-allocation of a shared spectrum pool. Here, different re-allocation flag bits are set to represent different trigger reasons. When a re-allocation flag bit is 0, it represents that the spectrum demand increment is caused by increase of a service load, when a re-allocation flag bit is 1, it represents that the spectrum demand increment is caused by improvement of a CSG-mode base station proportion, and when a re-allocation flag bit is 3, it represents that the spectrum demand increment is caused by change of a topological structure of a cell cluster; and
  a spectrum demand increment ($\Delta$): indicating a spectrum increment needed by a cell cluster.

According to different reasons, the following two different calculation methods for a spectrum demand increment ($\Delta$) are set:

a. If the re-allocation process is triggered due to the improvement of the CSG-mode base station proportion, a spectrum demand increment ($\Delta$) is defined as a value obtained by multiplying the changed quantities of CSG-mode base stations and OPEN-mode base stations by corresponding spectrum resource demands. If the spectrum demand increment ($\Delta$) is greater than a preset threshold value, the re-allocation process will be triggered. For instance, the quantity of the CSG-mode base stations in the cell cluster A is added with M, and the quantity of the OPEN-mode base stations is decreased by N, so the spectrum resource demand increment ($\Delta$) is:

$$\Delta Band_A = M \times Band_{CSG} - N \times \frac{Band - Band_{CSG} \times (TA \times A_{CSG} + TB \times B_{CSG})}{TA \times (1 - A_{CSG}) + TB \times (1 - B_{CSG})} \quad (3)$$

where the quantity of member base stations of the cell cluster A is TA, a CSG-mode base station proportion thereof is $A_{CSG}$, the quantity of member base stations of the cell cluster B is TB, a CSG-mode base station proportion thereof is $B_{CSG}$, the size of the shared spectrum pool is Band (MHz), and a working bandwidth of a CSG base station is $Band_{CSG}$ (MHz).

When the spectrum demand increment ($\Delta$) is greater than a preset threshold value, $\Delta Band_A/(Band_A+Band_B) > 10\%$, and in this case, re-allocation is triggered.

b. If the re-allocation process is caused by increase of a service load or topological change of a cell cluster, the spectrum demand increment is obtained by subtracting a currently owned spectrum resource quantity from a spectrum resource quantity meeting a requirement of a current load service of the cell cluster A. The sum of spectrum bandwidths required by the current service load, which are counted by the member base stations, can be represented as Bandcur. The currently owned spectrum bandwidth of the cell cluster A is BandA. If Bandcur-BandA>10%, the re-allocation process is triggered.

2. Spectrum Re-Allocation Answer Indication Signaling

After receiving a re-allocation request indication signaling sent from the spectrum controller SCA, the spectrum controller SCB will evaluate a current spectrum occupation state thereof and decide whether to agree with a re-allocation request. If the spectrum controller SCB agrees with the re-allocation request, the spectrum controller SCB will select different spectrum handoff manners according to different reasons causing the spectrum demand increment of the cell cluster A. The spectrum re-allocation answer indication signaling comprises the following parameters:

a refuse flag bit: if the refuse flag bit is 1, it represents that the spectrum controller SCB does not have idle spectra which can be provided for the cell cluster A, and will refuse a shared spectrum pool re-allocation request of the cell cluster A. If the refuse flag bit is 0, it represents that the spectrum controller SCB has idle spectrum resources which can be provided for the cell cluster A; and a conceding spectrum resource quantity f: showing a spectrum resource quantity which can be handoff by an operator cell cluster to another operator cell cluster in the shared spectrum pool, in the re-allocation process of the shared spectrum pool.

Figure 5:
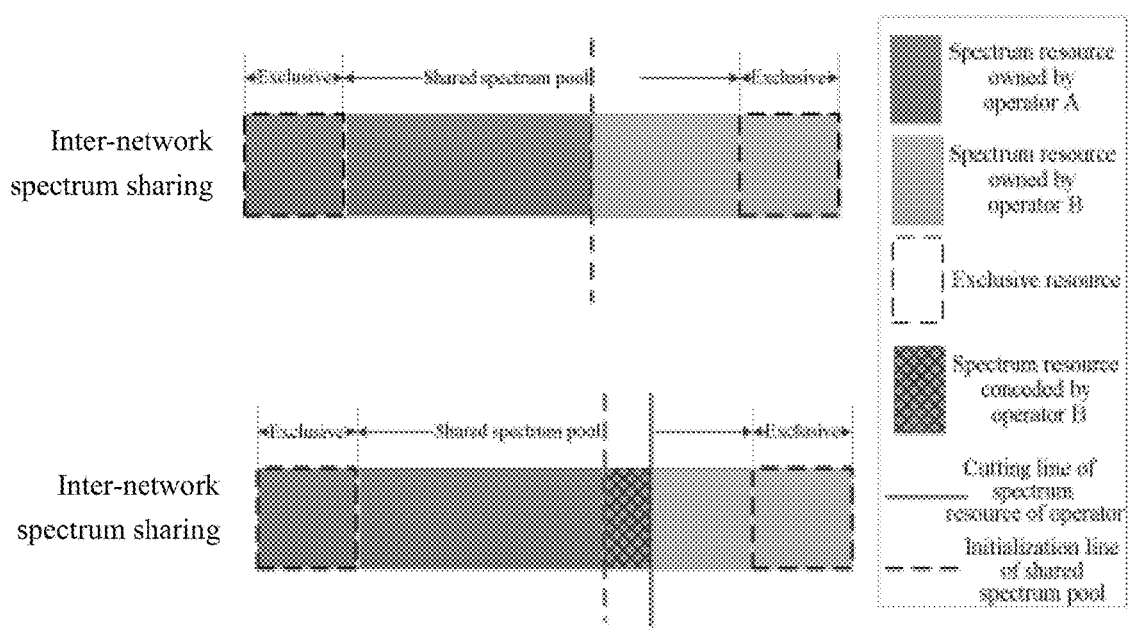
FIG. 5 is a diagram illustrating a re-allocation process of a shared spectrum pool.
Figure 6:
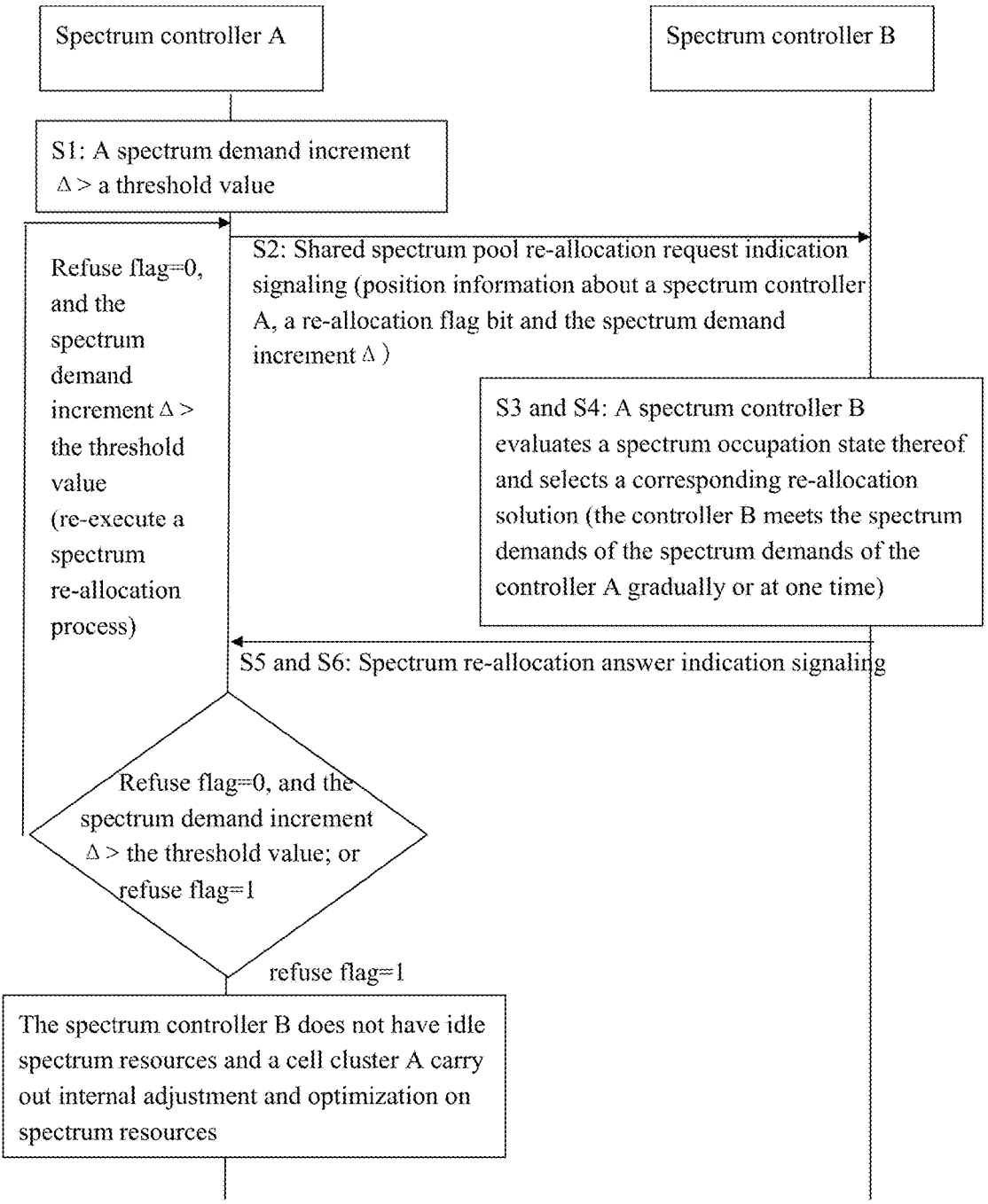
FIG. 6 is a flowchart showing a re-allocation process of a shared spectrum pool.

FIG. 5 and FIG. 6 show a shared spectrum re-allocation method in an inter-operator scenario. As mentioned above, many reasons will cause the variation of an allocation result obtained after initialized allocation completion of the shared spectrum pool. One reason is that the change of a CSG-mode base station proportion of a cell cluster causes the increase of a spectrum demand, and if a spectrum demand increment reaches a preset threshold value, the re-allocation process of the shared spectrum pool will be triggered (for instance, in the case of improvement of the CSG-mode base station proportion of the cell cluster A, more spectrum resources will be needed to guarantee the QoS of OPEN-mode base stations). Another reason is that a service load of a cell cluster is increased or a topological structure is changed (cell base stations are added/removed), and the cell cluster needs more spectrum resources to meet a service load demand thereof (for instance, the service load of the cell cluster A is raised, and it is necessary to occupy some spectrum resources of the cell cluster B to guarantee the QoS thereof). The increase of a spectrum demand is caused according to these different reasons, and the present invention implements the re-allocation process by virtue of different methods.

According to the above-mentioned method, specific implementation solutions are as follows (by taking the increase of the spectrum demand of the cell cluster A).

Step 1: In the cell cluster A, the increment of a CSG-mode base station proportion or the change of other relevant parameters will probably trigger a spectrum re-allocation process of a shared spectrum pool.

Step 2: When a spectrum demand increment caused by the change of the CSG bast station proportion or other relevant parameters of the cell cluster A reaches a preset threshold value, the spectrum controller SCA will send a shared spectrum pool re-allocation request indication signaling to the spectrum controller SCB. The signaling comprises re-allocation flag bits (flag 0: increase of a service load; flag 1: improvement of a CSG bast station proportion; flag 3: change of a topological structure, etc.), and corresponding spectrum demands.

Step 3: According to the received shared spectrum pool re-allocation request indication signaling, the spectrum controller SCB will evaluate a spectrum occupation state thereof and determine whether any idle spectrum resources can be provided for the cell cluster A. If the spectrum controller SCB does not have idle spectrum resources, a refuse flag bit in a spectrum re-allocation answer indication signaling will be set as 1. After receiving answer information, the spectrum controller SCA will carry out internal optimal allocation and adjustment on spectrum resources. If the spectrum controller SCB has idle bands, the refuse flag bit in the spectrum re-allocation answer indication signaling will be set as 0. In view of this situation, two spectrum re-allocation methods are as follows.

a. The spectrum controller SCB tries its best to meet the spectrum demand thereof according to the spectrum demand increment of the cell cluster A.

b. The spectrum controller SCB gradually meets the spectrum demand of the cell cluster A according to the spectrum demand increment of the cell cluster A.

According to different trigger reasons causing the increase of the spectrum demand of the cell cluster A, different spectrum re-allocation methods will be adopted (specifically referring to Step 4).

Step 4: If a re-allocation flag bit in a shared spectrum pool re-allocation request indication signaling received by the spectrum controller SCB is 1 (the improvement of the CSG-mode base station proportion causes the increase of the spectrum demand), the spectrum controller SCB will adopt the first re-allocation method, and tries its best to meet the spectrum demand of the cell cluster A (referring to Step 5 in detail); and if the re-allocation flag bit in the shared spectrum pool re-allocation request indication signaling received by the spectrum controller B is not 1 (the increase of the spectrum demand is caused by other reasons such as increase of a service load and change of a topological structure), the spectrum controller SCB will adopt the second re-allocation method, and gradually meets the spectrum demand of the cell cluster A (referring to Step 6 in detail). The spectrum controller SCB will send a spectrum re-allocation answer indication signaling to the spectrum controller SCA.

Step 5: If the spectrum controller SCB selects the first method, it will try its best to meet the spectrum demand of the cell cluster A. Here, a maximally spectrum resource quantity providable by the spectrum controller SCB is $f_{max}$, and is defined as maximum idle spectrum resource quantity owned by the cell cluster B. That is a value obtained by subtracting a spectrum resource quantity which are used currently by the cell cluster B from the total spectrum resource quantity owned by the cell cluster B after an initialization process of the shared spectrum pool.

If the maximal spectrum resource quantity $f_{max}$ providable by the spectrum controller SCB is greater than the spectrum demand increment ($\Delta$) of the cell cluster A: $f_{max} > \Delta$, a spectrum resource quantity provided for the cell cluster A by the spectrum controller SCB will be ($\Delta$). If the maximal spectrum resource quantity $f_{max}$ providable by the spectrum controller SCB is smaller than or equal to the spectrum demand increment ($\Delta$) of the cell cluster A: $f_{max} <= \Delta$, the spectrum resource quantity provided for the cell cluster A by the spectrum controller SCB is $f_{max}$.

If the spectrum controller SCB selects the second method, the spectrum controller SCB will not meet all spectrum demands of the spectrum controller SCA at one time, and will meet the spectrum demands of the cell cluster A step by step. Suppose the spectrum demand increment of the cell cluster A is ($\Delta$). In a first re-allocation process, the spectrum controller SCB will provide some spectrum resources f to the cell cluster A, wherein f is smaller than the spectrum demand increment ($\Delta$) of the cell cluster A. After receiving the spectrum resources f from the spectrum controller SCB, the spectrum controller SCA will evaluate a current spectrum occupation state thereof and decide whether to carry out the spectrum re-allocation process again. If the spectrum controller SCA re-sends a shared spectrum pool re-allocation request indication signaling, the spectrum controller SCB will evaluate a current spectrum occupation state thereof and return a spectrum re-allocation answer indication signaling. If the spectrum controller SCB does not have idle spectra, a refuse flag bit in a new spectrum re-allocation answer indication signaling will be set as A, and otherwise, the refuse flag bit will be set as 0.

In other words, if the re-allocation of the shared spectrum pool is triggered due to the increase of the CSG-mode base station proportion or CSG-mode base station quantity of a first cell cluster A, a second network provides corresponding spectrum resources to the first cell cluster A at one time according to a spectrum demand increment of a first network; and if the re-allocation of the shared spectrum pool is triggered due to the increase of a service load of the first cell cluster A or the change of a topological structure, the second network gradually provides corresponding spectrum resources to the first cell cluster A according to the spectrum demand increment of the first network.

When the corresponding spectrum resources are provided for the first network at one time, if a maximum spectrum resource quantity $f_{max}$ providable by the second network is greater than a spectrum demand increment of the first cell cluster A, the quantity of the spectrum resources provided for the first cell cluster A at one time by the second network is equal to the spectrum demand increment of the first cell cluster A. If the maximum spectrum resource quantity $f_{max}$ providable by the second network is smaller than or equal to the spectrum demand increment of the first cell cluster A, the quantity of the spectrum resources provided for the first cell cluster A at one time by the second network is equal to a maximum spectrum resource quantity $f_{max}$, wherein $f_{max}$ is a value obtained by subtracting a spectrum resource quantity which are used currently by a second cell cluster B from the total spectrum resource quantity owned by the second cell cluster B after the initialization process of the shared spectrum pool.

When the corresponding spectrum resources are gradually provided for the first network, the second network receives the spectrum demand increment of the first network, and judges whether idle spectra can be provided; if so, the second network provides spectrum resources, and the quantity of the spectrum resources provided for the first cell cluster A by the second network is smaller than the spectrum demand increment of the first cell cluster A; and if not, the second network refuses to provide spectrum resources. After receiving the spectrum resources from the second network, the first network judges whether to initiate a spectrum re-allocation process again; if so, the first network initiates spectrum re-allocation again, and the step that the second network judges whether idle spectra can be provided after receiving the spectrum demand increment of the first network is re-executed; and if not, the operation is ended.

In conclusion, the present invention, by designing an inter-operator dynamic spectrum sharing mechanism based on a CSG-mode base station proportion, optimizes a shared spectrum pool allocation policy, and aids in improving the average QoS of each operator base station in cell clusters.

In the present invention, an inter-operator shared spectrum pool initialized allocation and re-allocation mechanism based on a CSG-mode base station proportion of each operator cell cluster is proposed. By means of this mechanism, the QoS and fairness of OPEN-mode base stations of the cell clusters can be guaranteed, and the spectrum efficiency is improved. In inter-operator spectrum sharing, each cell base station is attached to different operators. In addition, working modes of the cell base stations can be divided into a CSG mode and an OPEN mode. The cell base stations working in the CSG mode only serve terminal subscribers registering on the present operator, and usually, the cell base stations serve a small number of terminal subscribers and have light loads; and the cell base stations working in the OPEN mode serve all terminal subscribers, and usually, the cell base stations serve a large number of terminal subscribers and have heavy loads. So, when two cell clusters belonging to different operators have an equal number of base stations, if CSG-mode base stations need to fixedly occupy a relative number of spectrum resources, a cell cluster having a high CSG-mode base station proportion needs more spectrum resources, thereby guaranteeing the spectrum resource quantity of OPEN-mode base stations of the cell cluster and the QoS of each terminal subscriber attached to the cell cluster.

Due to the switching randomness of a small cell, improvement of a CSG-mode base station proportion of a certain cell cluster or other relevant factors cause increase of a spectrum demand of the cell cluster, and a re-allocation process of the shared spectrum pool will be triggered. In a shared spectrum pool re-allocation stage, due to reasons such as the improvement of the CSG-mode base station proportion (the change of working modes of base stations in a cell cluster causes the improvement of the CSG-mode base station proportion of the cell cluster or the increase of a service load of the cell cluster), the increase of the spectrum demand of the cell cluster will trigger the re-allocation process. By means of the re-allocation process, spectrum resources of the shared spectrum pool can be allocated more flexibly and reasonably, thereby improving the spectrum efficiency, and guaranteeing the fairness in spectrum allocation between operators. Most of existing inter-operator spectrum sharing solutions only consider inter-operator spectrum sharing between macro base stations or inter-operator spectrum sharing between home base stations based on the same working mode. In actual deployment, home base stations in different working modes are usually deployed in a mixed manner within the same area. Compared with the prior art, the method proposed by the present invention comprehensively considers a differentiated demand for a spectrum caused by a working mode of a base station, and can more reasonably carry out initialized allocation and re-allocation on a shared spectrum pool together with a dynamic variation of the working mode of the base station, thereby improving the efficiency of the spectrum and the QoS of the base station.

<Second Embodiment>

In order to facilitate understanding, only contents, different from those of the first embodiment, of the second embodiment are introduced herein.

In the first embodiment, in the shared spectrum pool initialization stage, the first network and the second network divide the spectrum resources of the shared spectrum pool according to the CSG-mode base station proportion of each cell cluster and the quantity of the member base stations. The CSG-mode base station proportion is adopted due to the consideration of a relative small number of service subscribers of CSG base stations, spectrum resources of which the quantity is lower than an average value can be allocated thereto in an initialization process, and remaining spectrum resources in the shared spectrum pool are allocated to base stations working in an OPEN mode, thereby guaranteeing the QoS. If an OPEN base station proportion is adopted for calculation, the same performance will be provided.

Spectrum resources $Band_A$ occupied by the cell cluster A in the shared spectrum pool shall be adjusted, accordingly, to:

$$Band_A = TA \times (1 - A_{OPEN}) \times Band_{CSG} + TA \times A_{OPEN} \times \frac{Band - Band_{CSG} \times (TA \times (1 - A_{OPEN}) + TB \times (1 - B_{OPEN}))}{TA \times A_{OPEN} + TB \times B_{OPEN}} \quad (4)$$

Spectrum resources $Band_B$ occupied by the cell cluster B in the shared spectrum pool shall be adjusted accordingly, to:

$$Band_B = TB \times (1 - B_{OPEN}) \times Band_{CSG} + TB \times B_{OPEN} \times \frac{Band - Band_{CSG} \times (TA \times (1 - A_{OPEN}) + TB \times (1 - B_{OPEN}))}{TA \times A_{OPEN} + TB \times B_{OPEN}} \quad (5)$$

where the quantity of member base stations of the cell cluster A is TA, an OPEN-mode base station proportion of the cell cluster A is $A_{OPEN}$, the quantity of member base stations of the cell cluster B is TB, an OPEN-mode base station proportion of the cell cluster B is $B_{OPEN}$, the size of the shared spectrum pool is Band (MHz), and a working bandwidth of a CSG base station is $Band_{CSG}$ (MHz).

<Third Embodiment>

In order to facilitate understanding, only contents, different from those of the first embodiment, of the third embodiment are introduced herein.

In the third embodiment, the first network and the second network divide the spectrum resources of the shared spectrum pool according to the quantity of CSG base stations and the quantity of member base stations. Spectrum resources $Band_A$ occupied by the cell cluster A in the shared spectrum pool shall be adjusted, accordingly, to:

$$Band_A = NA_{CSG} \times Band_{CSG} + (TA - NA_{CSG}) \times \frac{Band - Band_{CSG} \times (NA_{CSG} + NB_{CSG})}{TA - NA_{CSG} + TB - NB_{CSG}} \quad (6)$$

Spectrum resources $Band_B$ occupied by the cell cluster B in the shared spectrum pool shall be adjusted to:

$$Band_B = NB_{CSG} \times Band_{CSG} + (TB - NB_{CSG}) \times \frac{Band - Band_{CSG} \times (NA_{CSG} + NB_{CSG})}{TA - NA_{CSG} + TB - NB_{CSG}} \quad (7)$$

where the quantity of member base stations of the cell cluster A is TA, the quantity of CSG base stations thereof is $NA_{CSG}$, the quantity of member base stations of the cell cluster B is TB, the quantity of CSG base stations thereof is $NB_{CSG}$, the size of the shared spectrum pool is Band (MHz), and a working bandwidth of each CSG base station is $Band_{CSG}$ (MHz).

<Fourth Embodiment>

In order to facilitate understanding, only contents, different from those of the first embodiment, of the fourth embodiment are introduced herein.

In the fourth embodiment, the first network and the second network divide the spectrum resources of the shared spectrum pool according to the quantity of OPEN base stations and the total quantity of member base stations of the first network and the second network.

Spectrum resources $Band_A$ occupied by the cell cluster A in the shared spectrum pool shall be adjusted, accordingly, to:

$$Band_A = (TA - MA_{OPEN}) \times Band_{CSG} + MA_{OPEN} \times \frac{Band - Band_{CSG} \times (TA - MA_{OPEN} + TB - MB_{OPEN})}{MA_{OPEN} + MB_{OPEN}} \quad (8)$$

Spectrum resources $Band_B$ occupied by the cell cluster B in the shared spectrum pool shall be adjusted to:

$$Band_B = (TB - MB_{OPEN}) \times Band_{CSG} + MB_{OPEN} \times \frac{Band - Band_{CSG} \times (TA - MA_{OPEN} + TB - MB_{OPEN})}{MA_{OPEN} + MB_{OPEN}} \quad (9)$$

where the quantity of member base stations of the cell cluster A is TA, the quantity of OPEN-mode base stations thereof is $MA_{OPEN}$, the quantity of member base stations of the cell cluster B is TB, the quantity of OPEN-mode base stations thereof is $MB_{OPEN}$, the size of the shared spectrum pool is Band (MHz), and a working bandwidth of a CSG-mode base station is $Band_{CSG}$ (MHz).

<Fifth Embodiment>

In order to facilitate understanding, only contents, different from those of the first embodiment, of the fifth embodiment are introduced herein.

In the first embodiment, in the shared spectrum pool initialization stage, the first network and the second network divide the spectrum resources of the shared spectrum pool according to the CSG-mode base station proportion of each cell cluster and the quantity of the member base stations. In the fifth embodiment, the first network and the second network divide the spectrum resources of the shared spectrum pool according to the quantity of terminals served by OPEN base stations in an initialization stage and the quantity of member base stations. The quantity of terminals served by home base stations remains unchanged within a long time with infrequent variation.

In principle, spectrum resources $Band_A$, allocated to the first network in the shared spectrum pool, are equal to the sum of spectrum resources occupied by CSG-mode base stations in a cell cluster A of the first network and spectrum resources occupied by OPEN-mode base stations in the cell cluster A. The spectrum resources occupied by the OPEN-mode base stations in the cell cluster A are calculated by means of the following method: multiply the quantity of terminals served by the OPEN-mode base stations in the cell cluster A of the first network during triggering of the initialization of the shared spectrum pool, by spectrum resources for all OPEN-mode base stations of the cell cluster A and/or a cell cluster B, and then divide by the total quantity of terminals served by the OPEN-mode base stations of the cell cluster A and the cell cluster B during triggering of the initialization of the shared spectrum pool.

Similarly, spectrum resources $Band_B$, allocated to the second network in the shared spectrum pool, are equal to the sum of spectrum resources occupied by CSG-mode base stations in the cell cluster B of the second network and spectrum resources occupied by the OPEN-mode base stations in the cell cluster B. The spectrum resources occupied by the OPEN-mode base stations in the cell cluster B are calculated by means of the following method: multiply the quantity of terminals served by the OPEN-mode base stations in the cell cluster B of the second network during triggering of the initialization of the shared spectrum pool, by spectrum resources for all OPEN-mode base stations of the cell cluster A and/or the cell cluster B, and then divide by the total quantity of terminals served by the OPEN-mode base stations of the cell cluster A and the cell cluster B during triggering of the initialization of the shared spectrum pool.

The spectrum resources $Band_A$ occupied by the cell cluster A in the shared spectrum pool shall be adjusted, accordingly, to:

$$Band_A = (TA - MA_{OPEN}) \times Band_{OPEN} + \\ MA_{OPEN} \times \frac{Band - Band_{CSG} \times (TA - MA_{OPEN} + TB - MB_{OPEN})}{MA_{OPEN} + MB_{OPEN}} \quad (10)$$

The spectrum resources $Band_B$ occupied by the cluster B in the shared spectrum pool shall be adjusted to:

$$Band_B = (TB - MB_{OPEN}) \times Band_{CSG} + \\ MB_{OPEN} \times \frac{Band - Band_{CSG} \times (TA - MA_{OPEN} + TB - MB_{OPEN})}{MA_{OPEN} + MB_{OPEN}} \quad (11)$$

where the quantity of member base stations of the cell cluster A is TA, the quantity of OPEN-mode base stations thereof is $MA_{OPEN}$, the quantity of member base stations of the cell cluster B is TB, the quantity of OPEN-mode base stations thereof is $MB_{OPEN}$, the size of the shared spectrum pool is Band (MHz), and a working bandwidth of a CSG-mode base station is $Band_{CSG}$ (MHz).

It should be noted that the quantity of the terminals served during triggering of the initialization of the shared spectrum pool can be the quantity of terminals interacting between the first network and the second network via a signaling in a spectrum resource initialization stage of the shared spectrum pool.

<Sixth Embodiment>

In order to facilitate understanding, only contents, different from those of the first embodiment, of the sixth embodiment are introduced herein.

Resources needed by OPEN-mode base stations are calculated using a preset QoS initial value in an initialization stage, and if remaining resources can meet demands of CSG-mode base stations, the shared spectrum pool is allocated in such a way: the OPEN-mode base stations are allocated by spectrum resources to meet the requirement of preset Qos and the CSG-mode base stations allocated by spectrum resources as they need.

If the remaining resources cannot meet the demands of the CSG-mode base stations, a QoS value is decreased, and the resources needed by the OPEN-mode base stations are re-calculated until the remaining resources meet QoS demands of the CSG-mode base stations.

Accordingly, spectrum resources $Band_A$ occupied by a cell cluster A in a shared spectrum pool shall be adjusted, to:

$$Band_A = (TA - MA_{OPEN}) \times Band_{CSG} + MA_{OPEN} \times Band_{OPEN} \quad (12)$$

Spectrum resources $Band_B$ occupied by a cell cluster B in the shared spectrum pool shall be adjusted to:

$$Band_B = (TB - MB_{OPEN}) \times Band_{CSG} + MB_{OPEN} \times Band_{OPEN} \quad (13)$$

where the quantity of member base stations of the cell cluster A is TA, the quantity of OPEN-mode base stations thereof is $MA_{OPEN}$, the quantity of member base stations of the cell cluster B is TB, the quantity of OPEN-mode base stations thereof is $MM_{OPEN}$, the size of the shared spectrum pool is Band (MHz), a working bandwidth of a CSG-mode base station is $Band_{CSG}$ (MHz), and a preset initial working bandwidth of each OPEN-mode base station is $Band_{OPEN}$ (MHz).

Referring to FIG. 4, when the second network calculates a shared spectrum pool initialized allocation proportion or initialized allocation value, the preset initial working bandwidth $Band_{OPEN}$ (MHz) of each OPEN-mode base station takes a low value as the QoS initial value, and shared spectrum resources occupied by the first network and the second network respectively are calculated according to the formula 12 and the formula 13. After the first network and the second network interact with each other about the shared spectrum resources occupied by the first network and the second network respectively, the first network judges whether it can be accepted. That is, the first network judges whether the shared spectrum pool has sufficient resources to meet the sum of the shared spectrum resources occupied by the first network and the second network.

If the first network judges that the shared spectrum pool has sufficient resources to meet the sum of the shared spectrum resources occupied by the first network and the second network, the first network sends an indication of increasing the preset initial working bandwidth $Band_{OPEN}$ (MHz) of each OPEN-mode base station to the second network. The first network can calculate and increase the preset initial working bandwidth $Band_{OPEN}$ (MHz) of each OPEN-mode base station to an intermediate value, and send an indication of adjusting the preset initial working bandwidth $Band_{OPEN}$ (MHz) of each OPEN-mode base station to the intermediate value to the second network. The first network and the second network allocate spectrum resources to the respective OPEN-mode base stations in accordance with the intermediate value.

If the first network judges that the shared spectrum pool does not have sufficient resources to meet the sum of the shared spectrum resources occupied by the first network and the second network, the first network sends an indication of decreasing the preset initial working bandwidth $Band_{OPEN}$ (MHz) of each OPEN-mode base station to a minimum value to the second network. The first network and the second network allocate spectrum resources to the respective OPEN-mode base stations in accordance with the minimum value.

It should be noted that the shared spectrum pool can reserve some resources which are not allocated in the initialization stage. Thus, in the above six embodiments, the spectrum resources $Band_A$, allocated to the first network, in the shared spectrum pool, are equal to the sum of the spectrum resources occupied by the CSG-mode base stations in the cell cluster A of the first network and the spectrum resources occupied by the OPEN-mode base stations in the cell cluster A; the spectrum resources $Band_B$ allocated to the second network are equal to the sum of the spectrum resources occupied by the CSG-mode base stations in the cell cluster B of the second network and the spectrum resources occupied by the OPEN-mode base stations in the cell cluster B; and the spectrum resources of the shared spectrum pool are equal to the sum of the $Band_A$, the $Band_B$ and the reserved spectrum resources.

The present invention, applied in an actual scenario that the quantity of service subscribers varies due to different working modes of home base stations, carries out an initialized allocation process on spectrum resources of a shared spectrum pool, based on a CSG-mode base station proportion of each cell cluster. This process can be regarded as optimal allocation for the shared spectrum pool under a static condition; and a subsequent re-allocation process can be regarded as a process of re-optimizing the initialized allocation result under a dynamic condition. The present invention adopts different share spectrum handoff mechanisms according to the increase of the spectrum demand of a certain cell cluster (trigger reasons comprising: variation of a CSG-mode base station proportion of a cell cluster, increase of a service load, topological change and the like), thereby improving the utilization rate of idle spectrum and improving the performance of an overall network.

The system and method for optimizing an inter-network shared spectrum provided by the present invention are illustrated above in detail, but apparently, specific implementation forms of the present invention are not limited thereto. Various obvious changes made for the present invention by those skilled in the art without departing from the spirit and claim scopes of the present invention fall within the protective scope of the present invention.

What is claimed is:

1. An inter-network shared frequency spectrum optimization method comprising at least a first network and a second network, the first network comprising a first cell cluster, the second network comprising a second cell cluster, the cell clusters having a shared spectrum pool, and each cell cluster having a plurality of base stations working in a CSG mode or an OPEN mode, wherein
the shared spectrum pool is established between the first network and the second network, the first network triggers initialization of the shared spectrum pool according to an spectrum demand thereof, and then the first network and the second network initialize the shared spectrum pool; the initialization of the shared spectrum pool comprises following steps:
the first network triggering the initialization of the shared spectrum pool according to a resource demand thereof, and sending a shared spectrum pool initialization indication signaling to the second network;
the second network calculating a shared spectrum pool initialized allocation proportion or a shared spectrum pool initialized allocation value, according to parameters of the shared spectrum pool initialization indication signaling, and sending the shared spectrum pool initialized allocation proportion or the shared spectrum pool initialized allocation value to the first network; and
the first network comparing the shared spectrum pool initialized allocation proportion or the shared spectrum pool initialized allocation value received by the first network, with a shared spectrum pool initialized allocation proportion or a shared spectrum pool initialized allocation value calculated by the first network,
when the comparison result shows consistency, sending an indication to the second network and allocating spectrum resources, and when the comparison result shows inconsistency, sending an indication to the second network and returning to the calculating step by the second network;
after the initialization of the shared spectrum pool is completed, quantity of a spectrum resource occupied by each OPEN-mode base station in the first cell cluster is same as that of a spectrum resource occupied by each OPEN-mode base station in the second cell cluster; or, quantity of spectrum resources individually occupied by terminals served by each OPEN-mode base station in the first cell cluster is same as that of spectrum resources individually occupied by terminals served by each OPEN-mode base station in the second cell cluster.

2. The inter-network shared frequency spectrum optimization method according to claim 1, wherein
the spectrum resource occupied by each OPEN-mode base station in the first cell cluster is obtained by means of following manner: subtracting spectrum resources occupied by CSG-mode base stations in the first cell cluster and the second cell cluster from the shared spectrum pool, and averagely allocating remaining spectrum resources to the OPEN-mode base stations in the first cell cluster and the second cell cluster.

3. The inter-network shared frequency spectrum optimization method according to claim 2, wherein
the spectrum resource occupied by each OPEN-mode base station in the first cell cluster is obtained by means of following manner: subtracting the spectrum resources occupied by the CSG-mode base stations in the first cell cluster and the second cell cluster from the shared spectrum pool, subtracting reserved spectrum resources, and then averagely allocating remaining spectrum resources to the OPEN-mode base stations in the first cell cluster and the second cell cluster.

4. The inter-network shared frequency spectrum optimization method according to claim 3, wherein
in an initialization process of the shared spectrum pool, the first network and the second network interact with each other about a CSG-mode base station proportion, a CSG-mode base station quantity, an OPEN-mode base station proportion or an OPEN-mode base station quantity in respective networks, so as to calculate the spectrum resource occupied by each OPEN-mode base station in the first cell cluster.

5. The inter-network shared frequency spectrum optimization method according to claim 1, wherein
the spectrum resource occupied by each OPEN-mode base station in the first cell cluster is obtained by preset working bandwidths occupied by the OPEN-mode base stations in the first cell cluster and the second cell cluster.

6. The inter-network shared frequency spectrum optimization method according to claim 1, wherein
the spectrum resource occupied by each OPEN-mode base station in the first cell cluster is obtained by means of the following manner: subtracting spectrum resources occupied by the CSG-mode base stations in the first cell cluster and the second cell cluster from the shared spectrum pool, and averagely allocating remaining spectrum resources to the terminals served by the OPEN-mode base stations in the first cell cluster and the second cell cluster.

7. The inter-network shared frequency spectrum optimization method according to claim 1, further comprising following steps: triggering re-allocation of the shared spectrum pool by the first network or the second network when a spectrum demand is increased after the initialization of the shared spectrum pool is completed.

8. The inter-network shared frequency spectrum optimization method according to claim 7, wherein
trigger conditions for triggering re-allocation of the shared spectrum pool comprise:
a change of the CSG-mode base station proportion or a change of quantity of the CSG-mode base stations in the cell cluster causes an increase of the spectrum demand, and a spectrum demand increment introduced by the increase of the spectrum demand reaches a preset threshold value;
an increase of a service load of the cell cluster causes the increase of the spectrum demand, and the spectrum demand increment reaches the preset threshold value; or
a change of a topological structure of the cell cluster causes the increase of the spectrum demand, and the spectrum demand increment reaches the preset threshold value.

9. The inter-network shared frequency spectrum optimization method according to claim 8, wherein
if the re-allocation of the shared spectrum pool is triggered due to an increase of the CSG-mode base station proportion or an increase of quantity of the CSG-mode base station in the first network, the second network provides, according to the spectrum demand increment of the first network, corresponding spectrum resources to the first cell cluster at one time; and if the re-allocation of the shared spectrum pool is triggered due to the increase of the service load of the first cell cluster or the change of the topological structure, the second network provides, according to the spectrum demand increment of the first network, corresponding spectrum resources to the first cell cluster gradually.

10. The inter-network shared frequency spectrum optimization method according to claim 9, wherein
when the corresponding spectrum resources are provided for the first network at one time,
if a maximum spectrum resource quantity fmax providable by the second network is greater than the spectrum demand increment of the first cell cluster, quantity of the spectrum resources provided for the first cell cluster at one time by the second network is equal to the spectrum demand increment; and
if the maximum spectrum resource quantity fmax providable by the second network is smaller than or equal to the spectrum demand increment of the first cell cluster, quantity of the spectrum resources provided for the first cell cluster at one time by the second network is equal to the maximum spectrum resource quantity, wherein fmax is a value obtained by subtracting a spectrum resource quantity which are used currently by the second cell cluster from a total spectrum resource quantity owned by the second cell cluster after the initialization of the shared spectrum pool.

11. The inter-network shared frequency spectrum optimization method according to claim 9, wherein
when the corresponding spectrum resources are provided for the first network gradually,
the second network receives the spectrum demand increment of the first network, and judges whether idle spectra can be provided; if so, the second network provides the first cell cluster with spectrum resources which is smaller than the spectrum demand increment; if not, the second network refuses to provide spectrum resources;
after receiving the spectrum resources, handoff from the second network, the first network judges whether to initiate a spectrum re-allocation again; if so, the first network initiates spectrum re-allocation again, and the judging step is re-executed; and if not, the method is ended.

12. The inter-network shared frequency spectrum optimization method according to claim 7, wherein re-allocating the shared spectrum pool comprises following steps:
triggering re-allocation of the shared spectrum pool by the first network to the second network, and sending a spectrum demand increment to the second network; and
determining by the second network, whether there are idle spectrum resources which can be provided for the first network, if the second network does not have idle spectrum resources, the second network sending a refuse indication to the first network, and if the second network has idle spectrum resources, the second network providing corresponding spectrum resources for the first network at one time or gradually according to the spectrum demand increment of the first network.

* * * * *